No. 778,955. PATENTED JAN. 3, 1905.
R. M. DUNLEVY.
DENTAL TOOL HOLDER.
APPLICATION FILED MAR. 4, 1904.

WITNESSES:
Herbert Bradley.
Fred Kirchner.

INVENTOR
Richard M. Dunlevy
by Christy and Christy Att'ys.

No. 778,955. Patented January 3, 1905.

UNITED STATES PATENT OFFICE.

RICHARD M. DUNLEVY, OF BELLEVUE, PENNSYLVANIA.

DENTAL TOOL-HOLDER.

SPECIFICATION forming part of Letters Patent No. 778,955, dated January 3, 1905.

Application filed March 4, 1904. Serial No. 196,636.

*To all whom it may concern:*

Be it known that I, RICHARD M. DUNLEVY, a citizen of the United States, residing at Bellevue, in the county of Allegheny and State of Pennsylvania, have invented or discovered certain new and useful Improvements in Dental Tool-Holders, of which improvements the following is a specification.

The invention described herein relates to certain improvements in tool-holders for dental engines, and has for its object a construction and combination of parts whereby a tool may be tightly secured within the gripping-jaws on a longitudinal movement of the driving-spindle, which by the same movement is caused to engage with the tubular spindle carrying the tool-chuck, whereby such chuck is connected with or released from the driving-spindle simultaneous with the securing of the tool in or its release from the chuck.

The invention is hereinafter more fully described and claimed.

Figure 1:
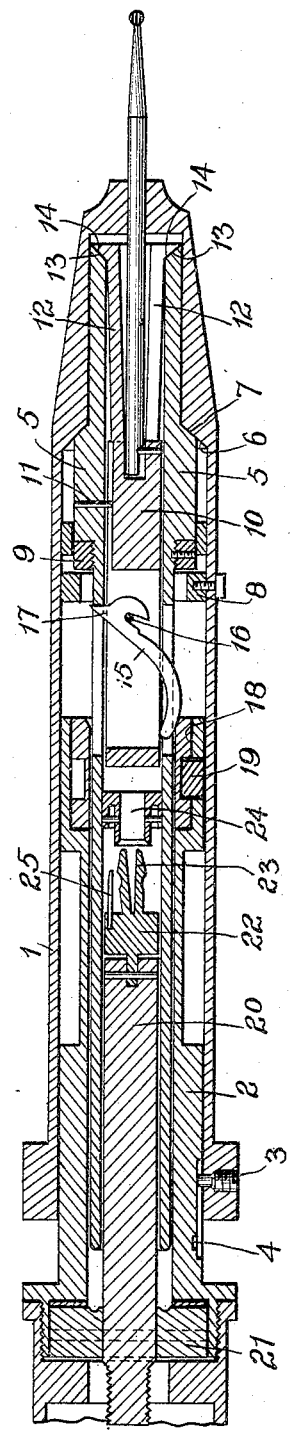
Figure 2:
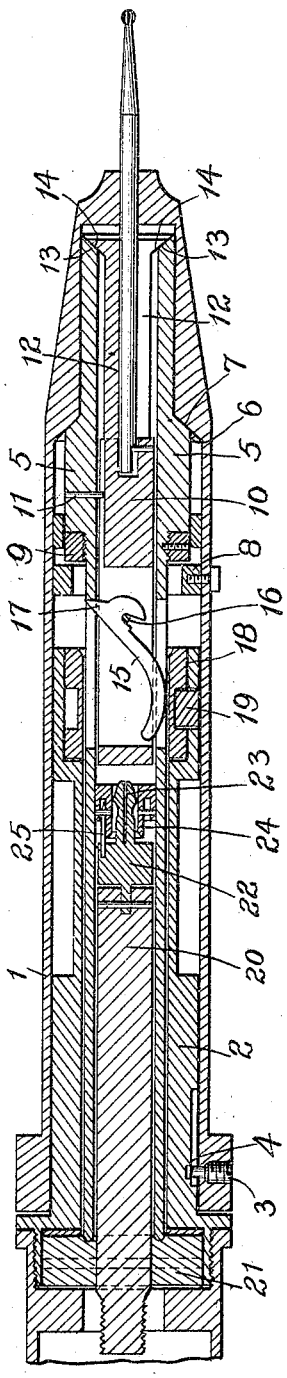

In the accompanying drawings, forming a part of this specification, Figures 1 and 2 are longitudinal sections of my improved tool-holder, showing the positions of the parts with the tool released and held in position.

Within the tubular holder 1 is arranged a tubular sliding block 2, free to move longitudinally back and forth in the holder, but held as against rotation therein by means of a screw-pin 3 engaging a longitudinal groove 4 of the sliding block. The tubular spindle 5 has its front portion supported by the holder, while its rear and reduced portion rotates within the sliding block 2. A shoulder 6 on the tubular spindle is held against an internal shoulder 7 on the holder by means of a ring 8, secured within the holder. This ring bears against a shoulder on the tubular spindle, such shoulder being preferably formed by means of a ring 9, adjustable on the tubular spindle, as by screw-threads, as shown. By the adjustment of this shoulder or ring 9 wear of surfaces can be compensated for. The chuck 10 is mounted within the tubular spindle with a freedom of longitudinal movement, but held as against rotation independent of the tubular spindle by a pin 11, engaging a longitudinal groove in the chuck. At its front end this block is provided with spring fingers or jaws 12, adapted to be closed around the stem of a tool by an inward movement imparted to said fingers by the inclined surface 13 on the tubular spindle bearing against a similar surface 14 on the fingers when the chuck is moved longitudinally to the left. The longitudinal movement of the chuck is preferably effected by the longitudinal movement of the sliding block 2 through any suitable form or construction of mechanism. A desirable construction to this end consists of a dog 15, pivotally mounted on a pin 16 within a slot formed in the rear end of the chuck. The nose 17 of the dog is adapted to bear against a shoulder on the tubular spindle, while the tail of the dog normally extends outside of the slot in the chuck, so as to be operated by the sliding block 2 or some part carried thereby. As the sliding block does not rotate, it is preferred to form the bearing-shoulder whereby the tail of the dog is shifted by means of a ring 18 loosely fitting within the sliding block, so that it may rotate with the tubular spindle and chuck, thus avoiding any wear on the tail of the dog. This antifriction-ring 18 is held as against movement longitudinally of the sliding block by means of a key 19 passing through an opening in the sliding block and engaging a peripheral groove in the ring. The driving-spindle 20 is provided with a head 21, loosely mounted in the outer end of the sliding block, so as to rotate freely in such block, but move back and forth therewith. At its front end the driving-spindle 20 is provided with means for engaging a part or portion of a clutch mechanism secured within the tubular spindle, so that when the driving-spindle is moved forward to the right it will be positively connected with the tubular spindle and rotate the same. A desirable construction to this end is clearly shown in Figs. 1 and 2 and consists of a pivotally-mounted head 21 on the driving-spindle, provided with spring guide-fingers 23, adapted to pass into a socket 24, secured within the tubular spindle. The pivotally-mounted head is also provided with a driving-pin 25, eccentrically arranged and adapted to engage a pin or shoulder on the socket 24, as shown. By this construction the driving-spindle and tubular spindle will be positively connected when the sliding block and driving-spindle are moved forward to secure a tool in position in the chuck and will be separated from each other when the sliding block is drawn backward or to the left to release a tool. By this construction it will be possible to change the tools in the holder without any stoppage of the motor.

I claim herein as my invention—

1. A dental tool-holder having in combination a tubular holder, a tubular spindle mounted in the holder, a chuck rotatable with but movable longitudinally independent of the tubular spindle, a driving-spindle movable longitudinally of the tubular spindle, a clutch for connecting the driving-spindle with the tubular spindle on a longitudinal movement of the driving-spindle and means for shifting the chuck or tool-holder on a longitudinal movement of the driving-spindle, substantially as set forth.

2. A dental tool-holder having in combination a tubular holder, a tubular spindle mounted in the holder, a chuck rotatable with but movable longitudinally independent of the tubular spindle, a sliding block movable longitudinal of the holder, a driving-spindle rotatably mounted in the block and movable back and forth therewith, a clutch device operative on a longitudinal movement of the driving-spindle to connect the latter to the tubular spindle and means operative on the longitudinal movement of the sliding block to shift the chuck or tool-holder, substantially as set forth.

3. A dental tool-holder having in combination a tubular holder, a tubular spindle mounted in the holder, a chuck or tool-holder rotatable with but movable longitudinally independent of the tubular spindle, a sliding block movable longitudinally of the holder, a driving-spindle rotatably mounted in the block and movable back and forth therewith, a clutch device having one member connected to the driving-spindle and the other member to the tubular spindle, and means operative by the sliding block to shift the chuck, substantially as set forth.

4. A dental tool-holder having in combination a tubular holder, a tubular spindle mounted in the holder, a chuck or tool-holder rotatable with but movable longitudinally independent of the tubular spindle, a dog pivotally connected to the chuck and having a bearing on the tubular spindle, a sliding block movable longitudinally of the holder, and tubular spindle, a ring carried by the sliding block and adapted to engage and shift the tail of the dog and a driving-spindle operatively connected to the tubular spindle, substantially as set forth.

In testimony whereof I have hereunto set my hand.

RICHARD M. DUNLEVY.

Witnesses:
DARWIN S. WOLCOTT,
F. E. GAITHER.